United States Patent
Cuddihy et al.

(10) Patent No.: US 9,371,035 B2
(45) Date of Patent: Jun. 21, 2016

(54) LIGHTED VEHICLE BIN ASSEMBLY AND METHOD OF CALIBRATING SAME

(71) Applicant: Ford Global Technologies, LLC, Dearborn, MI (US)

(72) Inventors: Mark A. Cuddihy, New Boston, MI (US); Manoharprasad K. Rao, Novi, MI (US); Carla Ann Gale, Northville, MI (US); Hubert Szawarski, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

(21) Appl. No.: 14/224,724

(22) Filed: Mar. 25, 2014

(65) Prior Publication Data

US 2015/0274069 A1     Oct. 1, 2015

(51) Int. Cl.
  *H05B 37/02*     (2006.01)
  *B60Q 3/02*      (2006.01)
  *G01J 5/00*      (2006.01)

(52) U.S. Cl.
  CPC .............. *B60Q 3/0293* (2013.01); *B60Q 3/022* (2013.01); *B60Q 3/0243* (2013.01); *B60Q 3/0296* (2013.01); *G01J 5/00* (2013.01); *H05B 37/02* (2013.01); *H05B 37/0227* (2013.01)

(58) Field of Classification Search
  CPC ....................................................... H05B 37/02
  USPC ............. 315/77, 82, 149, 152, 291, 307, 308, 315/312, 360
  See application file for complete search history.

(56) References Cited

U.S. PATENT DOCUMENTS

| 4,207,466 A * | 6/1980 | Drage .................. G01S 17/026 250/221 |
| 7,354,181 B2 | 4/2008 | Moell |
| 7,486,386 B1 * | 2/2009 | Holcombe ............... G01C 3/08 356/4.01 |
| 2008/0219017 A1* | 9/2008 | Cruickshank .......... B60Q 3/001 362/488 |
| 2013/0020883 A1* | 1/2013 | Ashoff ................... H05B 35/00 307/116 |

FOREIGN PATENT DOCUMENTS

WO     2011071891 A1    6/2011

* cited by examiner

*Primary Examiner* — Tung X Le
(74) *Attorney, Agent, or Firm* — Vichit Chea; Price Heneveld LLP

(57) ABSTRACT

A lighted vehicle bin assembly that activates a light source based on motion and recalibrates a sensor is provided. The lighted vehicle bin assembly includes a vehicle storage bin, a light source arranged to illuminate the bin, and a proximity sensor for sensing an object in the bin based on a sensor signal relative to a threshold. The lighted vehicle bin assembly also includes a controller that activates the light source when the sensor signal exceeds a threshold and recalibrates the sensor when the sensor signal exceeds the threshold for a time period.

20 Claims, 6 Drawing Sheets

LIGHTED VEHICLE BIN ASSEMBLY AND METHOD OF CALIBRATING SAME

FIELD OF THE INVENTION

The present invention generally relates to vehicle storage compartment illumination, and more particularly relates to detecting movement within a vehicle storage bin and providing illumination in the storage bin.

BACKGROUND OF THE INVENTION

Automotive vehicles are typically equipped with various storage bins or compartments located on the interior side of the doors, the instrument panel, and the center console. Some storage bins may include a continuously activated ambient lighting source; however, the constant illumination may be distracting to passengers such as the driver of the vehicle. Other storage bins, such as those configured without a cover, generally do not have a lighting source, thereby making it difficult for passengers to see into the bin in low light or no light conditions. Storage bins may be equipped with a sensor to detect a hand entering the bin and to turn on or activate the light as needed. However, changes in placements of objects into the bin or removal of objects from the bin may result in different sensor outputs which may prevent the normal functioning of the sensor and control of the light source. Accordingly, it would be desirable to provide for a lighted vehicle storage bin assembly that does not have the drawbacks of the conventional lighted storage bins.

SUMMARY OF THE INVENTION

According to a one aspect of the present invention, a lighted vehicle bin assembly is provided. The lighted vehicle bin assembly includes a vehicle storage bin, a light source arranged to illuminate the bin, and a proximity sensor for sensing an object in the bin based on a sensor signal relative to a threshold. The lighted vehicle bin assembly also includes a controller that activates the light source when the sensor signal changes relative to the threshold and recalibrates the sensor when an absolute value of the sensor signal exceeds the threshold for a time period.

According to another aspect of the present invention, a method of recalibrating a proximity sensor located in a lighted vehicle bin having a light source is provided. The method includes the steps of sensing an object in the vehicle bin with a proximity sensor generating a sensor signal, and turning on the light source when the sensor signal changes relative to a threshold. The method also includes the step of recalibrating the proximity sensor when an absolute value of the sensor signal exceeds the threshold for a time period.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
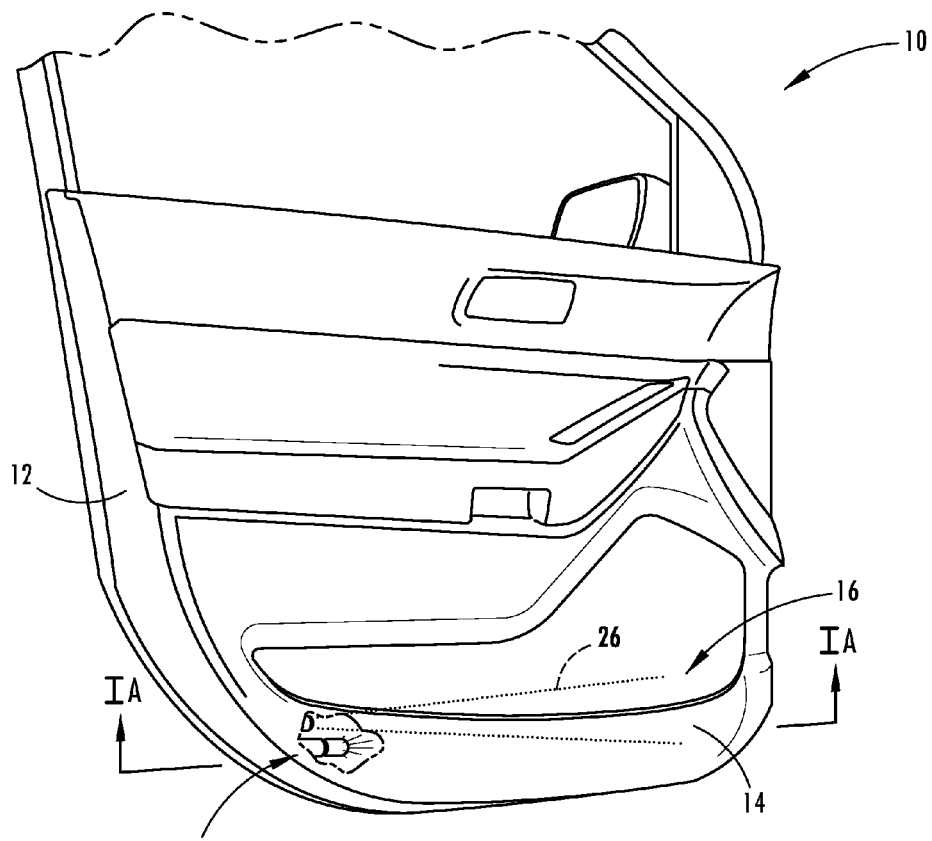
FIG. 1 is a perspective view of a motor vehicle door equipped with a storage bin assembly having a proximity sensor and light source, according to one embodiment.
Figure 1A:
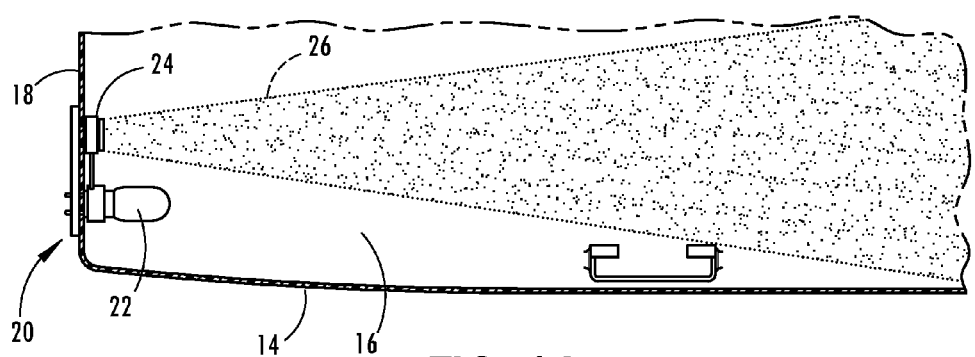
FIG. 1A is an enlarged cross-sectional view of the storage bin of FIG. 1 further illustrating the proximity sensor activated and the light source turned off.
Figure 2:
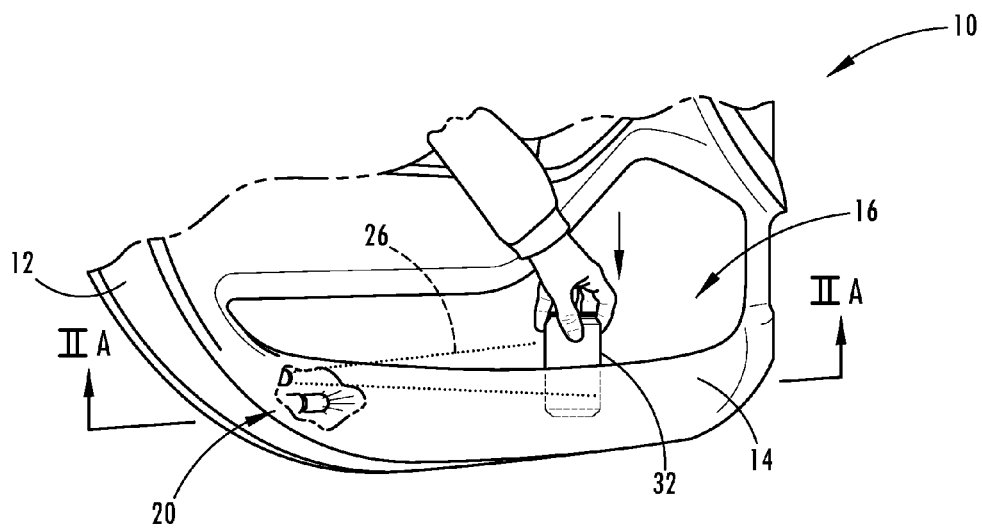
FIG. 2 is a partial perspective view of the vehicle door illustrating the insertion of an object such as a container engaged by a user's hand into the storage bin.
Figure 2A:
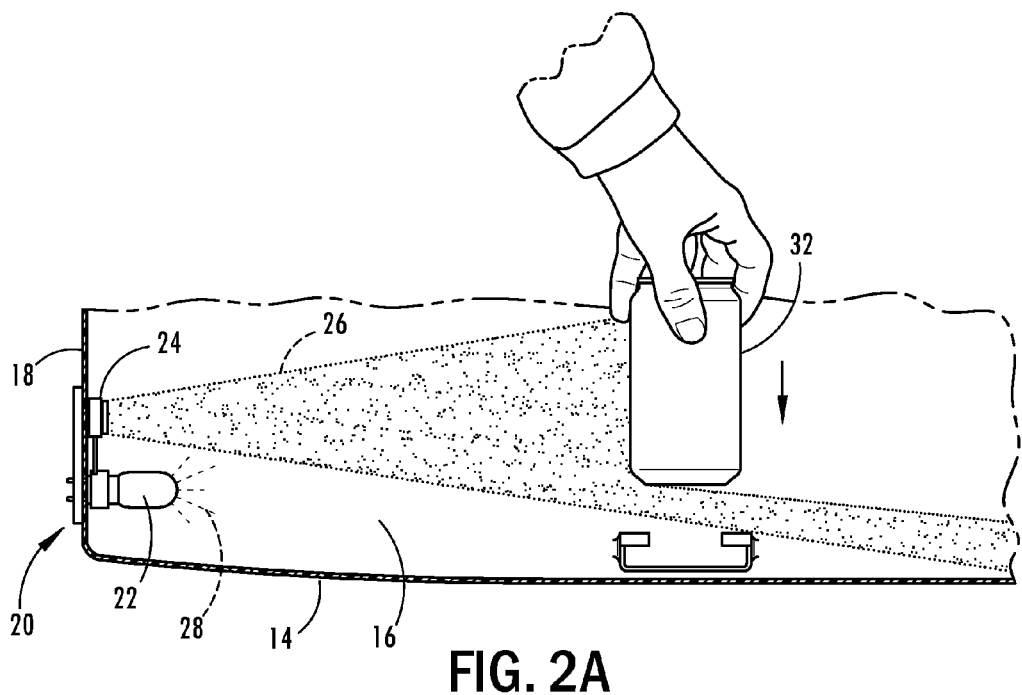
FIG. 2A is an enlarged cross-sectional view of the storage bin illustrating detection of the object placed in the bin and activation of the light source.
Figure 2B:
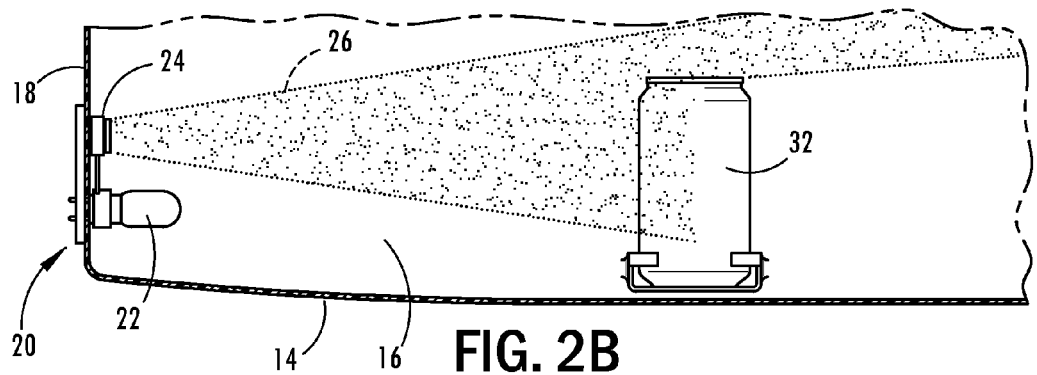
FIG. 2B is an enlarged cross-sectional view of the storage bin illustrating deactivation of the light source after a time period expires and recalibration of the sensor.
Figure 2C:
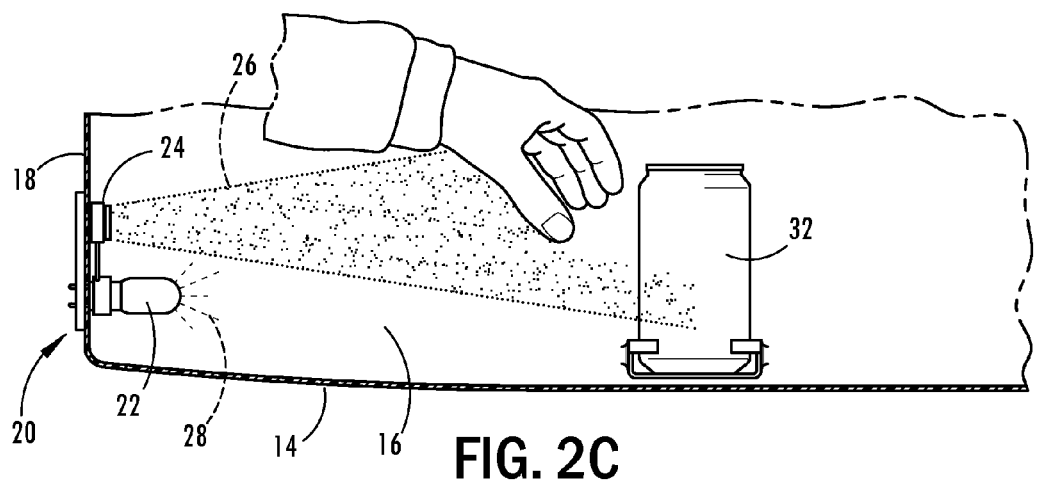
FIG. 2C is an enlarged cross-sectional view of the storage bin illustrating removal of the object engaged by a hand from the storage bin and activation of the light source.
Figure 2D:
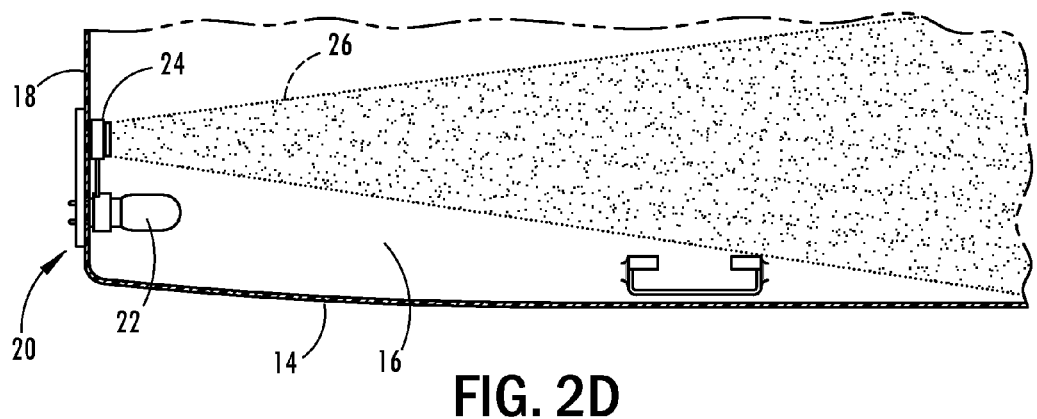
FIG. 2D is an enlarged cross-sectional view of the storage bin illustrating deactivation of the light source following removal of the object after a time period expires and recalibration of the sensor.

Referring to FIGS. 1-2D, a door 12 of an automotive (motor) vehicle 10 is generally illustrated equipped with a storage bin 14 provided on the interior side and having a lighted storage bin assembly 20, according to one embodiment. The door 12 may be the driver's side door or any other door of the vehicle 10 having a storage bin or compartment configured for storing one or more objects. The storage bin 14 is generally in close proximity to a vehicle seat so that a user may access the storage bin 14. According to one example, the storage bin 14 may be a map pocket located near the lower end of the door 12 and having trim panels forming a bottom wall and side walls 18 that define a storage space 16. The storage bin 14 has a generally open top end that allows access so that one or more objects may be placed into or removed from storage space 16 within the storage bin 14. A user, such as the vehicle driver, may simply reach into the storage bin 14 through the open top end to place one or more objects within the storage bin 14 or to remove one or more objects therefrom.

The lighted storage bin assembly 20 provides automatically controlled lighting to the storage bin 14 to enable a user to readily view contents within the storage bin 14, particularly in the dark or low light environment conditions. The lighted storage bin assembly 20 includes a light source 22 shown mounted within the storage bin 14 onto the interior surface of wall 18. Light source 22 is located and oriented so as to provide light illumination output sufficient to illuminate the interior of the storage bin 14. The light source 22 may include one or more high intensity light emitting diodes (LEDs), according to one embodiment. According to other embodiments, light source 22 may employ other lamps, such as one or more incandescent lamps and could employ a light source that changes from a lower ambient level and/or color to a brighter white or some other state more suitable for viewing objects in the storage bin 14 at night or in dark environmental conditions. While the light source 22 is shown located in the storage bin 14, it should be appreciated that the light source 22 may be located at another location outside of the bin 14 to illuminate light towards or into the bin 14, according to other embodiments.

The lighted storage bin assembly 20 also includes a proximity sensor 24 shown located within the storage bin 14 assembled to the interior surface of wall 18. The proximity sensor 24 is oriented to detect one or more objects and motion of the one or more objects within the storage bin 14, such as a user's hand and one or more other objects entering into the storage bin 14 or withdrawing from the storage bin 14. According to one embodiment, the proximity sensor 24 may include a time-of-flight sensor, such as an infrared (IR) sensor. The IR sensor may be an active IR sensor having both the IR emitter for emitting IR radiation in a sensor field 26 within the storage bin 14 and an IR sensing unit for sensing IR radiation reflected from objects disposed within the storage bin 14 and the walls defining the storage bin 14. The IR sensor generates an output signal indicative of the sensor field and objects located therein. It should be appreciated that other time-of-flight sensors, such as passive IR sensors or ultrasonic sensors which generally detect reflected sensor signals may be employed as the proximity sensor 24. It should further be appreciated that multiple sensors may be employed to cover any desired shape or area of the storage bin 14. Further, other sensors that may be employed as the proximity sensor may include capacitive sensors, inductive sensors, optical sensors, temperature sensors, video imaging devices (e.g., cameras) or a combination of sensors.

The proximity sensor 24 is shown installed in the storage bin 14 and arranged to detect the hand of a user entering the storage bin 14 and to generate a sensor signal. The light source 22 is controlled to activate or turn on when a change in the proximity sensor signal relative to a threshold is detected so as to provide lighting of the storage bin 14 to enable the user to view the storage bin 14 in the dark or low light conditions. The proximity sensor 24 is automatically recalibrated to enable the accurate sensing of an object, such as the hand of a person entering and being removed from the storage bin 14. Typically, the recalibration includes resetting the sensor signal to a value of zero. When an object within the sensor field 26 changes position, such as a user's hand entering the storage bin 14, the proximity sensor 24 generates a change in the sensor signal to a non-zero signal value. The sensor signal is compared to a threshold value or to positive and negative threshold values, to determine whether or not an object of a sufficient size has entered the storage bin 14. If the absolute value of the sensor signal exceeds the threshold, the light source 22 is activated (i.e., turned on). The light source 22 may be turned on for as long as the object is present in the storage bin such that the absolute value of the sensor signal exceeds the threshold, up to a maximum predetermined time period, such as fifteen seconds, as determined by a timer. The light source 22 is turned off (deactivated) when the object is removed from the storage bin such that the absolute value of the sensor signal is less than or equal to the threshold or when the timer expires, whichever occurs first. However, when an object is placed within the storage bin 14, moved within the storage bin 14 or is removed from the storage bin 14, such that the proximity sensor signal relative to threshold changes for longer than the predetermined time period, the normal function of the proximity sensor 24 may be affected because the sensor is no longer calibrated for a zero value. The storage bin assembly 20 detects changes in the sensor signal and recalibrates the proximity sensor 24 to accommodate the presence, removal or moving of an object within the storage bin 14.

Referring particularly to FIGS. 2A-2D, a user's hand 30 is shown engaging an object 32 in the form of a drink container and being disposed through the open top end of the storage bin 14 and into the storage space 16 of the storage bin 14. When this occurs, the proximity sensor 24 senses via the sensor field 26 the presence and motion of the hand 30 and object 32 entering the storage bin 14 which causes the sensor signal to increase above a threshold value. When the absolute value of the sensor signal exceeds the threshold, the light source 22 is turned on to provide light illumination in the storage bin 14. The user's hand is shown removed from the storage bin 14 in FIG. 2B, and the object 32 is shown remaining within the storage bin 14. The newly positioned object 32 will typically cause a change in the proximity sensor field 26 which will change the sensor signal. If the user's hand and object 32 were removed prior to expiration of the timer, the light source 22 would turn off. The timer counts down from the time the light source 22 was activated and, provided the absolute value of the sensor signal exceeds the threshold, after the timer has timed out, e.g., 15 seconds, the light source 22 is turned off. The object 32 is shown remaining within the storage bin 14 which causes a change in the proximity sensor field 26 relative to the last calibration. When this occurs, the proximity sensor 24 is recalibrated to reset the proximity sensor 24 to a value of zero, according to one embodiment, so that any future detection of objects within the storage bin 14 is detected relative to the new placement of the object 32 therein.

In FIG. 2C, the user's hand is shown again re-entering the storage bin 14 to engage the drink container 32 for removal therefrom. When this occurs, the recalibrated proximity sensor 24 detects the motion of the hand 30 and the engaged object 32 being removed from the storage bin 14 such that the light source 22 is activated to generate light illumination 28 within the storage bin 14. As such, a user may view the lighted contents within storage bin 14 during removal of the object 32. If the user removes the hand without the object 32 such that the absolute value of the sensor signal drops back below the threshold, then the light is turned off. The timer initiates a count down from the time the light source 22 is activated. Following removal of the object 32, the proximity sensor field 26 typically changes to a value significantly below the recalibrated 'zero' value and the light source 22 is turned off as shown in FIG. 2D. If the proximity sensor value is less than the negative threshold, the timer is restarted. Following expiration of the timer, the proximity sensor 24 is recalibrated to account for the removal of the object 32 from the storage bin 14. With the recalibration, the proximity sensor 24 may detect objects within the storage bin 14 relative to the newly recalibrated state with the object removed from the storage bin 14.

Figure 3:
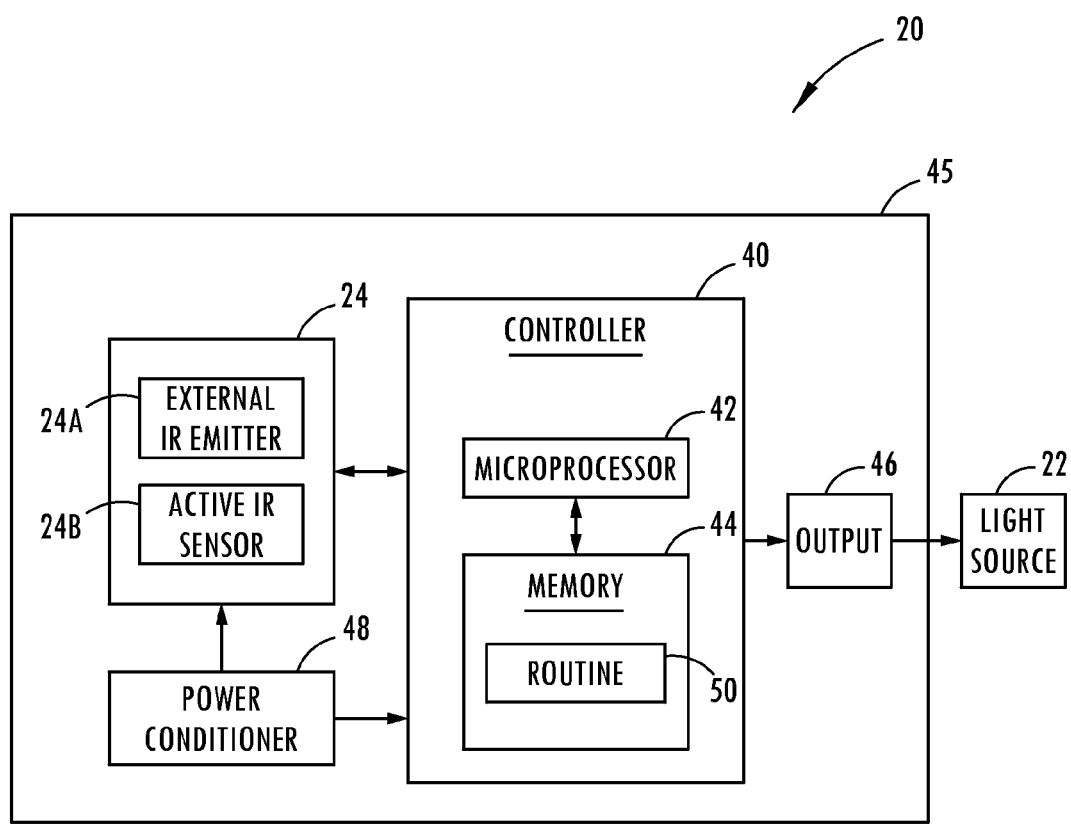
FIG. 3 is a block diagram illustrating the light and calibration controller employed by the storage bin assembly, according to one embodiment.

Referring to FIG. 3, the lighted vehicle bin assembly 20 is shown having a controller 40 for controlling the activation of the light source 22 and the recalibration of the proximity sensor 24. The controller 40 may include a microprocessor 42 or other control circuitry and further includes memory 44 which may store a control routine 50 executable by the microprocessor 50. The lighted vehicle bin assembly 20 is further shown including the proximity sensor 24 which includes an external IR emitter 24A and an active IR sensor 24B. In addition, power conditioning circuitry 48 is provided. The power conditioning circuitry 48 may receive the electrical power from the vehicle battery and convert the power to a usable voltage supplied to both the proximity sensor 24 and the controller 40. The controller 40 has an output 46 which provides an output signal to control the light source 22. According to one embodiment, an integrated circuit (IC) chip 45 may contain the microprocessor 42, memory 44, proximity sensor 24 and power conditioning circuitry 48 and may operate at 3.3 volts and may be adapted to operate from at 12 volts from a vehicle battery.

Figure 4:
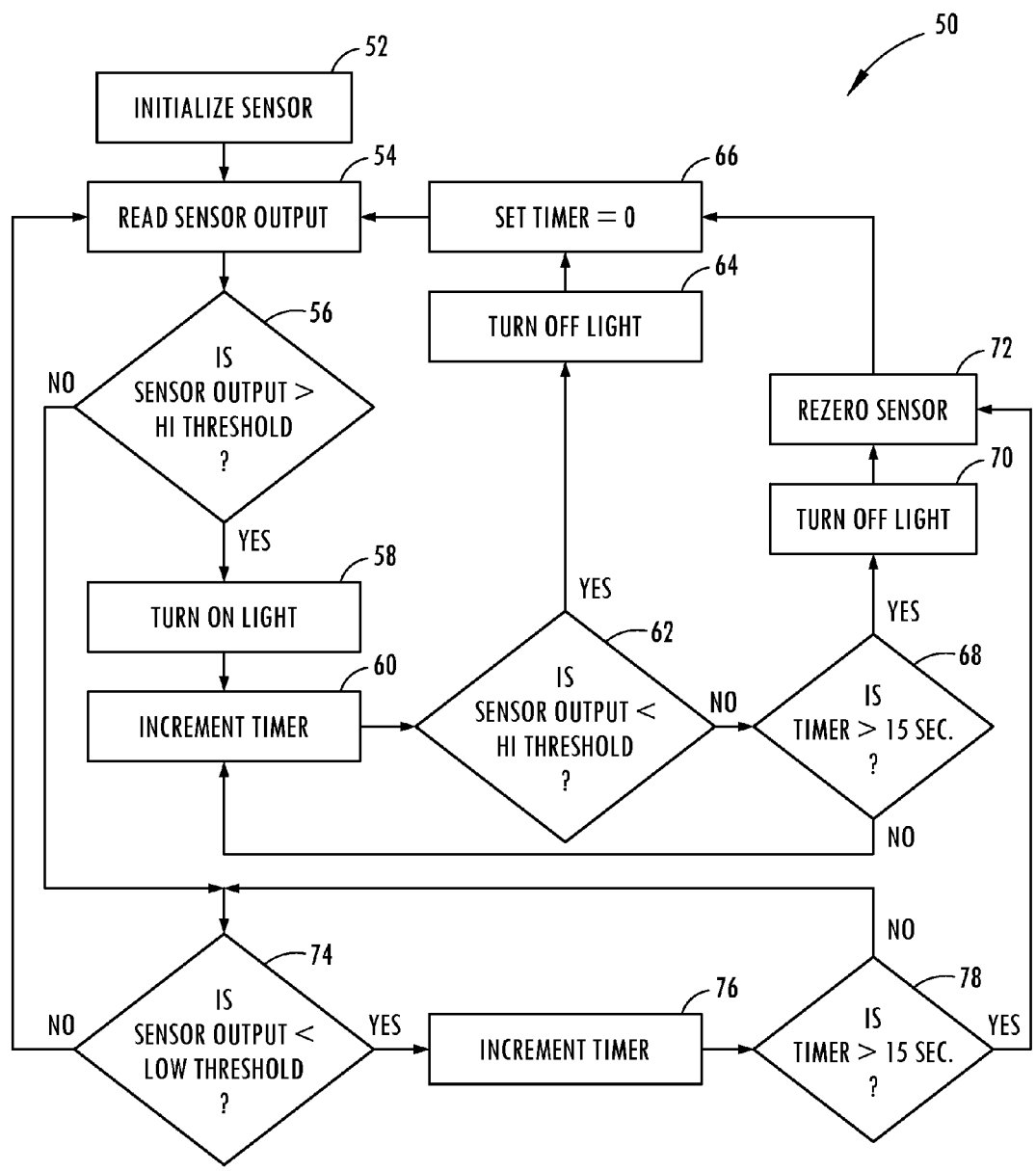
FIG. 4 is a flow diagram illustrating a routine for controlling illumination of the storage bin and recalibrating the proximity sensor, according to one embodiment.

The control routine 50 for controlling the activation of the light source 22 and recalibration of the proximity sensor 24 is shown in FIG. 4, according to one embodiment. Routine 50 begins at step 52 by initializing the proximity sensor. Next, at step 54, the proximity sensor output signal is generates and read. Routine 50 then proceeds to decision step 56 to determine if the sensor output signal is greater than a hi threshold. If the sensor output signal exceeds the hi threshold, routine 50 proceeds to turn on the light source at step 58 and to increment the timer at step 60. Next, at decision step 62, routine 50 will determine if the sensor output signal is less than the hi threshold and, if so, will proceed to step 64 to turn off the light source and to set the timer equal to zero at step 66. Otherwise, if the sensor output signal remains higher than the hi threshold, routine 50 proceeds to decision step 68 to determine if the timer has timed out at a time period greater than 15 seconds and, if so, turns off the light source at step 70 and recalibrates the sensor at step 72 by setting the sensor signal to a value of zero. The rezeroing of the sensor signal at step 72 recalibrates the sensor, according to one embodiment, to account for differences in objects within the sensor field so as to reset the proximity sensor signal to a baseline value of zero. If the timer has not yet timed out, routine 50 returns to increment the timer at step 60 until the timer times out as long as the sensor signal is greater than the hi threshold.

If the sensor output does not exceed the hi threshold as determined by decision step 56, routine 50 proceeds to decision step 74 to determine if the sensor output signal is less than a low threshold. If the sensor output signal is less than a low threshold, the timer is incremented at step 76 and routine 50 proceeds to decision step 78 to determine if the timer has exceeded the fifteen second time out period at decision block 78. If the timer has timed out, routine 50 will proceed to step 72 to recalibrate the sensor so as to perform a recalibration of the sensor. Otherwise, the sensor waits for the timer to expire as long as the sensor output threshold is less than the low threshold.

Figure 5:
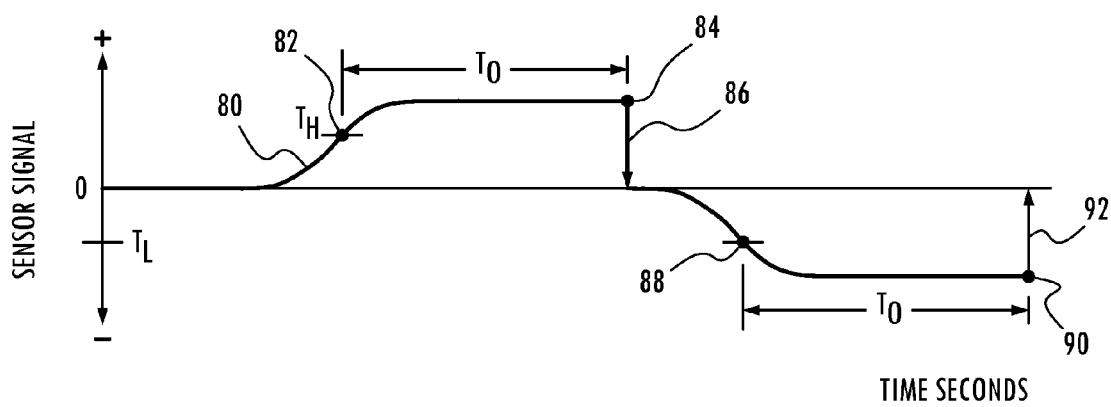
FIG. 5 is a timing diagram illustrating a sensor signal during activation of the light source and calibration of the sensor.

One example of a sensor signal that activates the light source in response to a hi threshold $T_H$ and a low threshold $T_L$ and the recalibration of the sensor signal is illustrated in FIG. 5. The sensor signal is shown starting at a calibrated value of zero in which the present sensor field and generated sensor signal detects no movement of an object relative to the last calibration. When movement of an object within the vehicle bin is detected, the signal 80 changes in amplitude shown initially rising up with a positive ramp signal. When signal 80 reaches and exceeds the hi threshold $T_H$ at point 82, the light source is turned on to illuminate the storage bin. If the signal 80 remains above the hi threshold $T_H$ for the timer timeout period $T_O$ which is reached at point 84, a recalibration of the sensor occurs at line 86 in which the signal is adjusted or reset back to a value of zero. As such, sensor signal 80 has a zero value absent any further movement of an object within the storage bin. Sensor signal 80 is shown decreasing with a negative ramp signal thereafter and dropping below the low threshold $T_L$ at point 88. When this occurs, the light source is turned on to illuminate the storage bin. If the signal 80 remains below the low threshold $T_L$ for the timer timeout period $T_O$ which occurs at point 90, the sensor signal 80 is recalibrated at line 92 by resetting the sensor signal value to zero. Hence, the recalibrated sensor 80 will generate a sensor output value of zero until movement of an object is detected within the storage bin.

The lighted vehicle bin assembly 20 activates the light source when the sensor signal changes relative to a threshold and recalibrates the sensor when an absolute value of the sensor signal exceeds the threshold for a time period. In one embodiment, the sensor signal is compared to a hi threshold and activation of the light source and recalibration occurs when the sensor signal exceeds the hi threshold, and further activation of the light source and recalibration occurs when the sensor signal falls below a low threshold. While hi and low thresholds are employed in one embodiment, it should be appreciated that one or more threshold values may be employed. Further, it should be appreciated that the recalibration of the signal may be achieved by setting the signal to a non-zero value, or resetting one or more thresholds, according to other embodiments.

Accordingly, the lighted vehicle bin assembly 20 and method of calibrating the proximity sensor for the vehicle bin assembly advantageously provides for a lighting of a vehicle storage compartment in a manner that accommodates movement of objects within the storage bin by recalibrating the proximity sensor. This advantageously eliminates unwanted light distractions to the vehicle driver or passengers within the vehicle and provides for an effective lighting of the storage bin.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

What is claimed is:
1. A lighted vehicle bin assembly comprising:
a vehicle storage bin;
a light source arranged to illuminate the bin;
a proximity sensor for sensing an object in the bin based on a sensor signal relative to a threshold; and
a controller that activates the light source when the sensor signal changes relative to the threshold and recalibrates the sensor when an absolute value of the sensor signal exceeds the threshold for a time period.

2. The bin assembly of claim 1, wherein the controller compares the sensor signal to a first threshold and recalibrates the sensor signal when the signal exceeds the first threshold for the time period.

3. The bin assembly of claim 2, wherein the controller compares the sensor signal to a negative second threshold, and recalibrates the sensor when the signal is less than the negative second threshold for the time period.

4. The bin assembly of claim 1, wherein the recalibration comprises setting the sensor signal to a zero value.

5. The bin assembly of claim 1, wherein the proximity sensor comprises an infrared sensor.

6. The bin assembly of claim 1, wherein the light source and the proximity sensor are located within the bin.

7. The bin assembly of claim 1, wherein the bin comprises a vehicle storage compartment having an open access door to allow insertion and removal of objects.

8. The bin assembly of claim 7, wherein the bin comprises a vehicle door storage bin.

9. The bin assembly of claim 1, wherein the light source comprises an LED.

10. The bin assembly of claim 1, wherein the controller activates the light source when the sensor signal exceeds the threshold.

11. A method of recalibrating a proximity sensor located in a lighted vehicle bin having a light source, said method comprising:
    sensing an object in the vehicle bin with a proximity sensor generating a sensor signal;
    turning on the light source when the sensor signal changes relative to a threshold; and
    recalibrating the proximity sensor when an absolute value of the sensor signal exceeds the threshold for a time period.

12. The method of claim 11 further comprising the step of turning off the light source when the sensor signal is less than the threshold.

13. The method of claim 11, wherein the step of recalibrating the proximity sensor comprises comparing the sensor signal to a first threshold, wherein the proximity sensor is recalibrated when the sensor signal exceeds the first threshold for the time period.

14. The method of claim 13, wherein the step of recalibrating the proximity sensor further comprises comparing the sensor signal to a negative second threshold, wherein the sensor is recalibrated when the sensor signal is less than the negative second threshold for the time period.

15. The method of claim 11, wherein the step of recalibrating the proximity sensor comprises setting the sensor signal to a zero value.

16. The method of claim 11, wherein the step of turning on the light source comprises turning on the light source located within the vehicle bin.

17. The method of claim 11, wherein the step of sensing comprises sensing an object in the vehicle bin with an infrared sensor.

18. The method of claim 11, wherein the bin comprises a vehicle storage compartment having an open access door to allow insertion and removal of objects.

19. The method of claim 18, wherein the bin comprises a vehicle door storage bin.

20. The method of claim 11, wherein the step of turning on the light source occurs when the sensor signal exceeds the threshold.

* * * * *